(12) United States Patent
Filipovich et al.

(10) Patent No.: US 10,259,370 B2
(45) Date of Patent: Apr. 16, 2019

(54) ITEM HOLDER HAVING A SELF-ADJUSTING AIR BLADDER SYSTEM

(71) Applicant: Ford Global Technologies, LLC, Dearborn, MI (US)

(72) Inventors: Michael M. Filipovich, West Bloomfield, MI (US); Michael Kolich, Windsor (CA); Johnathan Andrew Line, Northville, MI (US); Michael Medoro, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/428,299

(22) Filed: Feb. 9, 2017

(65) Prior Publication Data

US 2018/0222372 A1    Aug. 9, 2018

(51) Int. Cl.
*A47K 1/08* (2006.01)
*B60N 3/10* (2006.01)

(52) U.S. Cl.
CPC ............. *B60N 3/106* (2013.01); *B60N 3/108* (2013.01)

(58) Field of Classification Search
CPC ........................... B60N 3/108; Y10S 224/926
USPC ................................................ 224/544, 926
See application file for complete search history.

(56) References Cited

U.S. PATENT DOCUMENTS

| | | | | |
|---|---|---|---|---|
| 2,874,826 A * | 2/1959 | Matthews | ............... | B65D 81/03 206/522 |
| 2,956,687 A * | 10/1960 | Robichaud | ......... | B65D 81/1075 165/900 |
| 3,762,766 A * | 10/1973 | Barecki | .................. | B64D 11/06 297/217.1 |
| 5,056,533 A * | 10/1991 | Solano | ................. | A47D 15/006 128/876 |
| 5,180,060 A * | 1/1993 | Forti | ..................... | B65D 81/052 206/522 |
| 5,687,874 A | 11/1997 | Omori et al. | | |
| 6,302,364 B1 * | 10/2001 | Chiueh | .................... | B60N 3/10 206/545 |
| 6,637,617 B2 * | 10/2003 | Eisenbraun | ............ | B60N 3/103 220/720 |
| 7,147,192 B2 * | 12/2006 | Kong | ..................... | B60N 3/108 248/311.2 |
| 7,972,063 B1 | 7/2011 | Barsalou | | |
| 8,196,647 B2 | 6/2012 | Matsukawa | | |
| 9,119,472 B2 * | 9/2015 | Holzhueter | ............ | B60N 2/919 |
| 9,505,325 B2 * | 11/2016 | Doan | ..................... | B60N 2/427 |

(Continued)

*Primary Examiner* — Adam J Waggenspack
(74) *Attorney, Agent, or Firm* — Vichit Chea; Price Heneveld LLP (57) ABSTRACT

An item holder includes a receiving well with a sidewall and an upper opening. One or more air bladders are disposed within the receiving well and are operable between inflated and deflated conditions within the receiving well. The air bladders substantially fill the upper opening when the air bladders are in the inflated condition to provide a filled receiving well appearance. A sensor is configured to sense an item being received in or removed from the receiving well. The air bladders deflate from the inflated condition to the deflated condition as an item is received in the receiving well. The air bladders may include a filler material that is predisposed to an expanded condition which correlates to the air bladders being in the inflated condition to substantially fill the upper opening of the receiving well.

10 Claims, 9 Drawing Sheets

(56) References Cited

U.S. PATENT DOCUMENTS

| | | | | |
|---|---|---|---|---|
| 2004/0031895 A1* | 2/2004 | Langhoff | ............... | B60N 3/105 |
| | | | | 248/311.2 |
| 2004/0084461 A1* | 5/2004 | Eisenbraun | ............ | B60N 3/103 |
| | | | | 220/739 |
| 2005/0205739 A1* | 9/2005 | DePue | .................... | B60N 3/106 |
| | | | | 248/311.2 |
| 2007/0095423 A1* | 5/2007 | Vigano | ................ | B65D 81/052 |
| | | | | 141/114 |
| 2009/0104324 A1 | 4/2009 | Bradley | | |
| 2017/0320650 A1* | 11/2017 | Aguilar | .................. | B65D 81/03 |

* cited by examiner

ITEM HOLDER HAVING A SELF-ADJUSTING AIR BLADDER SYSTEM

FIELD OF THE INVENTION

The present invention generally relates to an item holder for a vehicle interior, and more specifically, to an item holder having a self-adjusting air bladder system adapted to hold an item in a custom friction fit manner.

BACKGROUND OF THE INVENTION

Vehicle occupants are often seeking convenient locations within a vehicle interior to place and retain beverage containers of varying sizes, as well as other smaller personal items, such as pens, notepads, parking slips, cards, phones and other portable electronic devices. In current vehicle interiors, these smaller personal items are usually stored in a cup-holder or shallow open bin in a vehicle interior console where they are insufficiently retained, and thus are subject to moving around, vibrating, and making noise as the vehicle is driven and maneuvered. Further, these items can be ejected from a small storage bin or cup holder having an open top during the maneuvering of the vehicle. For beverage containers of varying sizes, it is difficult to have a receptacle that offers a one-size-fits-all solution. Thus, it is desirable to provide an item holder in a dedicated location for storing and retaining small personal items and various size beverage containers in such a manner that the items are retained securely in-place while maneuvering a vehicle and conveniently located in close proximity to a vehicle occupant for easy retrieval.

SUMMARY OF THE INVENTION

One aspect of the present invention includes an item holder having a receiving well with an upper opening. A plurality of air bladders are disposed in the receiving well. Each air bladder includes a porous casing having an outer surface with an upper portion that is substantially flush with the upper opening of the receiving well when the air-bladders are in an at-rest position. The air bladders deflate to a retracted position from the at-rest position as an item is received in the receiving well.

Another aspect of the present invention includes an item holder having a receiving well with one or more air bladders, wherein each air bladder includes an outer casing sealing an interior cavity. A filler material is disposed within each interior cavity of the air bladders. The filler material is operable between expanded and compressed conditions, wherein the one or more air bladders substantially fill an upper opening of the receiving well when the filler material is in the expanded condition within the interior cavity.

Yet another aspect of the present invention includes an item holder having a receiving well with a sidewall and an upper opening. Air bladders are coupled to the sidewall and operable between inflated and deflated conditions. The air bladders substantially fill the upper opening when the air bladders are in the inflated condition. A sensor is configured to sense an item being received in or removed from the receiving well. The air bladders deflate from the inflated condition to the deflated condition as the item is received in the receiving well.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
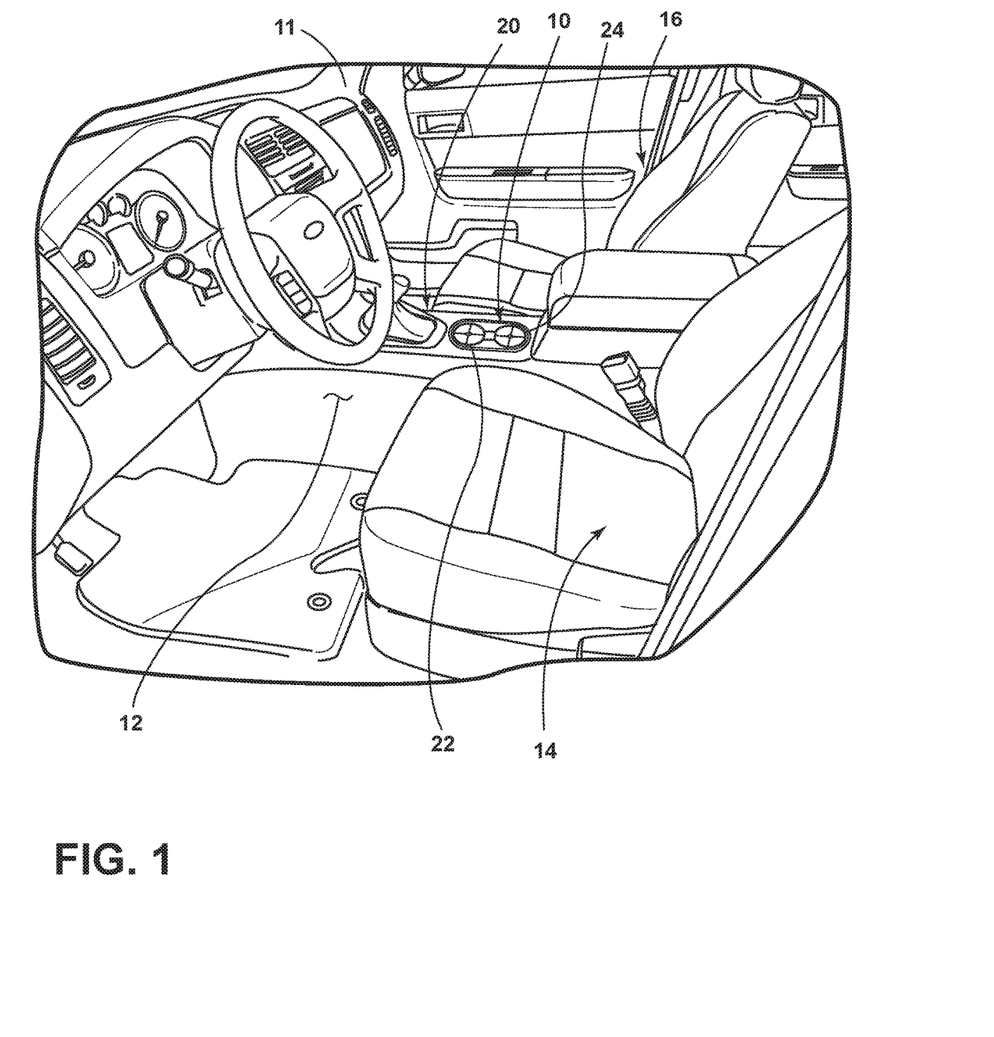
FIG. 1 is a top perspective view of a vehicle interior having a center console including multiple item holders.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates an item holder assembly disposed within a vehicle interior 12 of a vehicle 11. The vehicle interior 12 includes a driver seat 14 and a passenger seat 16 with a console assembly 20 that is generally centrally disposed between the driver seat 14 and the passenger seat 16. The item holder assembly 10, as shown in FIG. 1, is centrally disposed on the console assembly 20 and includes first and second item holders 22, 24. The first and second item holders 22, 24 may be part of a modular unit, wherein the item holder assembly 10 includes one or more individual item holders. The first and second item holders 22, 24 are contemplated to be substantially similar in structure and design, such that the description of one item holder 22 or 24 within this disclosure will implicitly describe features of the other, unless otherwise noted. In FIG. 1, the first and second item holders 22, 24 are shown in at-rest and unoccupied configurations.

Figure 2:
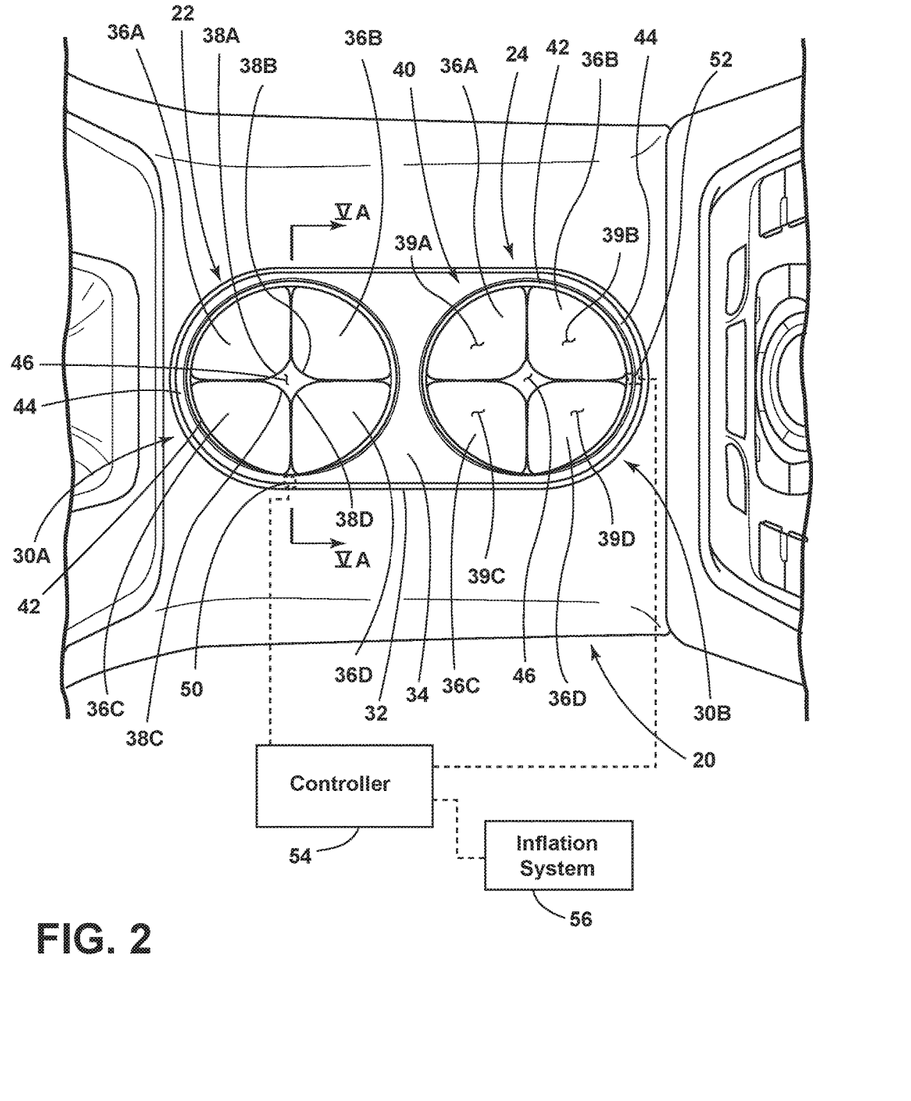
FIG. 2 is a top plan view of the multiple item holders of FIG. 1 in an at-rest position.

Referring now to FIG. 2, the first and second item holders 22, 24 are shown in unoccupied configurations. In the unoccupied configuration, both the first and second item holders 22, 24 are not retaining an item therein. This configuration may also be referred to as an at-rest position with respect to an air bladder system 30A and 30B included in each item holder 22, 24. Each air bladder system 30A, 30B includes a plurality of air bladders which will be described with reference to air bladder system 30A alone. While air bladder system 30A is described, it is to be understood that the description of air bladder system 30A also describes air bladder system 30B.

Each of the first and second item holders 22, 24 are shown disposed within a trim member 32 having an upper surface 34. It is contemplated that the first and second item holders 22, 24 can be removed from the center console assembly 20 by removing the trim article 32, or be removing the individual item holders 22, 24 themselves. Each of the first and second item holders 22, 24 includes a receiving well 40 having an upper opening 42 defined around an upper rim portion 44. The receiving wells 40 include retaining areas 46 which are configured to retain an item within the receiving wells 40. The retaining areas 46 are defined by air bladders 36A-36D of the air bladder systems 30A, 30B. With specific reference to air bladders system 30A, the air bladders 36A-36D include outer surfaces 38A-38D which generally define the parameters of the retaining area 46. With reference to air bladder system 30B, the air bladders 36A-36D include upper portions 39A-39D of the outer surfaces 38A-38D that are substantially flush with the upper opening 42 of the receiving well 40 while the air bladders 36A-36D are in an at-rest position. From the at-rest position shown in FIG. 2, the air bladders 36A-36D are configured to deflate to a retracted position (FIG. 3) as an item is received in the retaining area 46 of the receiving well 40. In the at-rest position, the air bladders 36A-36D provide a clean aesthetic across the center console assembly 20 with the upper portions 39A-39D of the air bladders 36A-36D being substantially flush with the upper opening 42 of the receiving well 40, as well as being substantially flush with the upper surface 34 of trim article 32. While the air bladder system 30A, 30B are identified as having multiple air bladders 36A-36D, it is contemplated that a single air bladder may be used with the present concept, wherein the single air bladder includes a plurality of pockets that may be identified with reference numeral 36A-36D. Thus, the first and second item holders 22, 24 may include multiple air bladders or a single air bladder for retaining an item therein.

For moving from the inflated condition or at-rest position to the retracted or deflated position, the air bladders 36A-36D must interact with an item as received within the retaining area 46 of the receiving well 40. One such interaction may include a sensor 50 or 52 shown associated with the first and second item holders 22, 24, respectively. The sensor 50 is shown disposed on the trim article 32 adjacent the first item holder 22 and is contemplated to detect the reception of an item within the receiving well 40 of the first item holder 22. Sensor 52 is shown disposed on the upper opening 42 of the receiving well 40 of the second item holder 24 at the rim portion 44 thereof. Similarly, the sensor 52 is contemplated to detect or sense an item being received or removed from the retaining area 46 of the receiving well 40 of the second item holder 24. While the sensors 50, 52 are shown disposed in the positions illustrated in the exemplary embodiment of FIG. 2, it is contemplated that the sensors 50, 52 may be disposed on any portion of the first and second item holders 22, 24 or any article adjacent thereto, wherein the sensors 50, 52 can detect an item being received or removed from the receiving wells 40 of the first and second item holders 22, 24.

As further illustrated in FIG. 2, the sensors 50, 52 are communicatively coupled to a controller 54 which is further coupled to an inflation system 56. The sensors 50, 52 shown in FIG. 2 are contemplated to include one of a light sensor or a proximity sensor disposed at or near the rim portion 44 of the item holders 22, 24. As noted above, the sensors 50, 52 may also be disposed in any location within or near the item holders 22, 24 for properly sensing, or otherwise detecting, an object being received in the receiving wells 40. It is contemplated that any number of sensors can be used to provide the controller 54 with the necessary signal information to properly control an inflation level of the air bladders 36A-36D using the inflation system 56. In this embodiment, the inflation system 56 is operably coupled to the controller 54 and further coupled to the air bladders 36A-36D for controlling the inflation levels of the air bladders 36A-36D of both item holders 22, 24. Coupling of the air bladders 36A-36D is further described below with reference to FIGS. 5A-5B.

As noted above, the sensors 50, 52 may be proximity sensors, which may be in the form of capacitance sensors, ultrasonic transducers, radio frequency transducers, optical transducers, magnetic sensors, infrared sensors, force/pressure sensors, or electromechanical sensors. It is contemplated that the sensors 50, 52 may be integrated into or communicatively coupled to the air bladders 36A-36D to sense an amount of deflection of the air bladders 36A-36D as an item is received in the receiving wells 40 of the item holders 22, 24. Thus, the sensors 50, 52 are configured to detect the presence of an object received in, or being received in, one of the first and second item holders 22, 24. The object detection information is sent to the controller 54 as an electronic signal for processing. As further noted above, the sensors 50, 52 may be light sensors, which may be in the form of spectrophotometers or photo detectors which can provide a variety of information to the controller 54. As light sensors, the sensors 50, 52 may be configured to detect the presence of an object received in, being received in, or being removed from one of the first and second item holders 22, 24.

Figure 3:
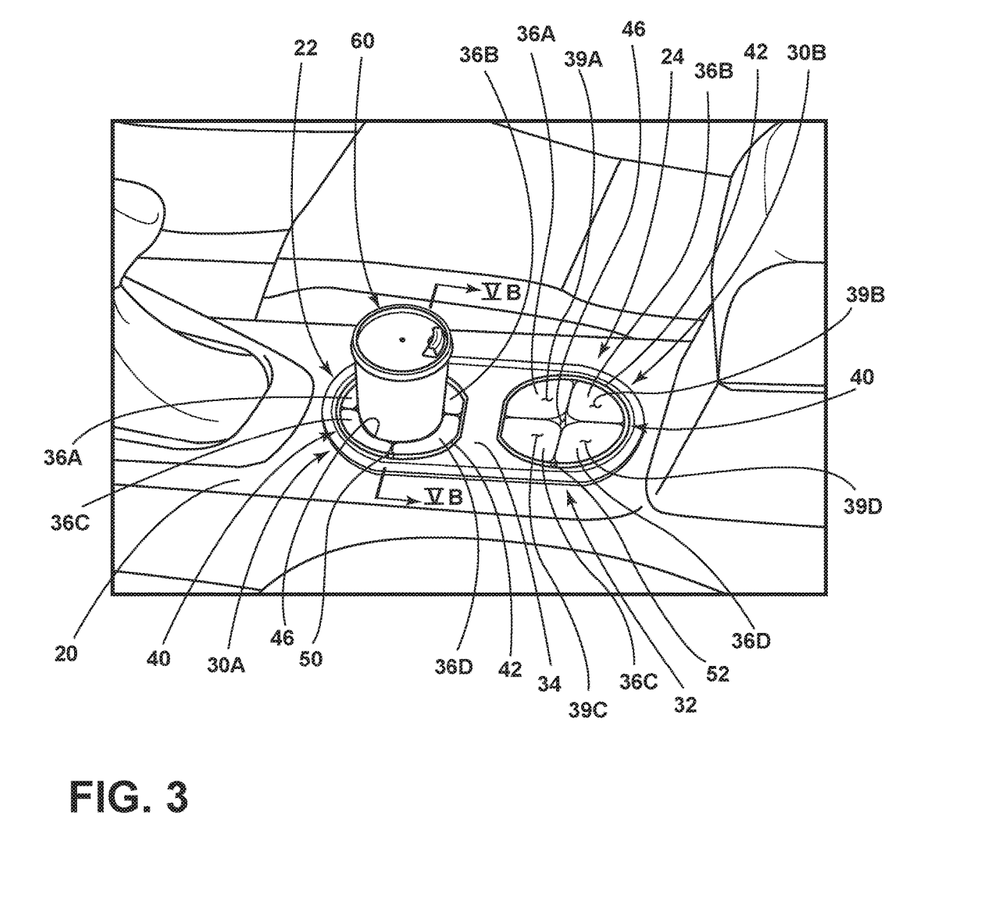
FIG. 3 is a top perspective view of the vehicle interior of FIG. 1 showing the multiple item holders with a beverage container retained therein.

Referring now to FIG. 3, the first and second item holders 22, 24 are shown with an item disposed in the first item holder 22. The item shown in FIG. 3 is in the form of a beverage container 60. Thus, the second item holder 24 is in an at-rest position, wherein the air bladders 36A-36D are inflated to a point at which the air bladders 36A-36D generally fill the receiving well 40. In the at-rest position, the air bladders 36A-36D of the second item holder 24 have the upper portions 39A-39D thereof substantially flush with the upper opening 42 of the receiving well 40. In this way, the air bladders 36A-36D substantially fill the upper opening 42 of the receiving well 40 in the at-rest position. With the beverage container 60 disposed in the first item holder 22, the air bladders 36A-36D of the first item holder 22 are in a deflated condition or a retracted position as opposed to the inflated condition or at-rest position of the air bladders 36A-36D of the second item holder 24. In the retracted position, the air bladders 36A-36D of the first item holder 22 are partially deflated to redefine the contours of the retaining area 46, such that the beverage container 60 is positively retained in the receiving well 40 of the first item holder 22 by engagement with the air bladders 36A-36D thereof. It is contemplated that the air bladders 36A-36D provide a customized retaining area 46 for the beverage container 60 and will also provide a customized retaining area 46 for another beverage container that is larger or smaller than the beverage container 60 illustrated in FIG. 3. In this way, the item holders 22, 24 of the present concept provide customized support and retention of items stored in the retaining areas 46 thereof, as further described below.

With reference to FIGS. 2 and 3, the beverage container 60 is contemplated to be sensed or detected by the sensor 50 as entering the receiving well 40 of the first item holder 22. The sensor 50 is configured to send a signal to the controller 54 which may further send a signal to the inflation system 56 to initiate a deflation sequence of the air bladders 36A-36D from the at-rest position (FIG. 2) to the retracted position (FIG. 3), wherein the first item holder 22 can adequately retain and support the beverage container 60. It is further contemplated that the beverage container 60 can be used to impart a force on the air bladders 36A-36D to allow for air to expel from an interior cavity of the air bladders 36A-36D through a porous casing or an associated valve assembly, as further described below with reference to FIGS. 5A-5B. When the beverage container 60 is removed from the retaining area 46, the sensor 50 is contemplated to detect this change and send a signal to the controller 54 which further sends a signal to the inflation system 56 to initiate an inflation sequence of the air bladders 36A-36D to inflate the air bladders 36A-36D to the at-rest position shown in conjunction with the air bladders 36A-36D of the second item holder 24 in FIG. 3. Further, it is contemplated that the air bladders 36A-36D can inflate to the at-rest position from the retracted position due to a resilient internal material disposed within the air bladders 36A-36D. The self-adjusting capability of the air bladders 36A-36D to resume the at-rest position from the retracted position is further described below with reference to FIGS. 5A, 5B, 7A, 7B. In this way, the upper portions 39A-39D of the outer casings of the air bladders 36A-36D are substantially flush with the upper opening 42 of the receiving well 40 when the air bladders 36A-36D are returned to the at-rest or inflated condition.

Figure 4:
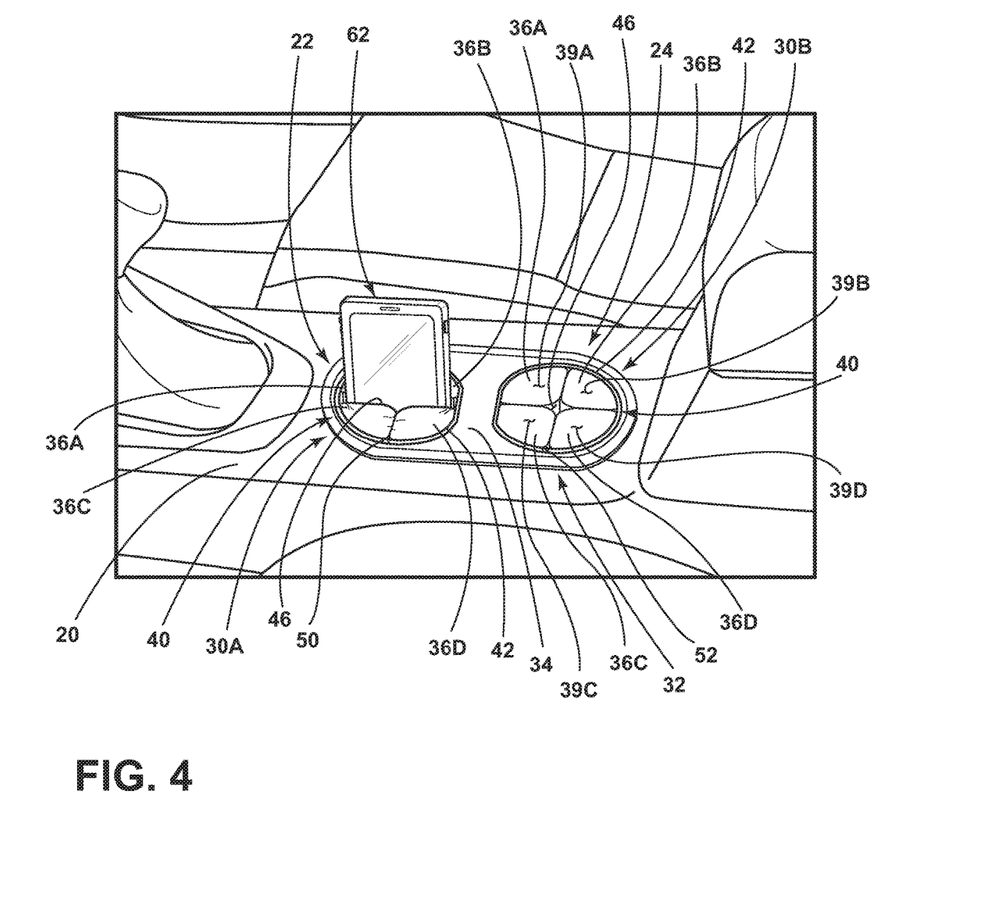
FIG. 4 is a top perspective view of the vehicle interior of FIG. 1 showing the multiple item holders with a portable electronic device retained therein.

Referring now to FIG. 4, the first and second item holders 22, 24 are shown with an item disposed in the first item holder 22. The item shown in FIG. 4 is in the form of a portable electronic device 62, such as a mobile phone. The second item holder 24 is in the at-rest position, wherein the air bladders 36A-36D are in an inflated condition. In the inflated condition, the air bladders 36A-36D of the second item holder 24 are inflated to a point at which the air bladders 36A-36D generally fill the receiving well 40. In the at-rest position, the air bladders 36A-36D of the second item holder 24 have the upper portions 39A-39D thereof substantially flush with the upper opening 42 of the receiving well 40. In this way, the air bladders 36A-36D substantially fill the upper opening 42 of the receiving well 40 in the at-rest position. With the portable electronic device 62 disposed in the first item holder 22, the air bladders 36A-36D of the first item holder 22 are in a partially deflated condition or a retracted position as opposed to the inflated condition or at-rest position of the air bladders 36A-36D of the second item holder 24. In the retracted position, the air bladders 36A-36D of the first item holder 22 are partially deflated to redefine the contours of the retaining area 46, such that the portable electronic device 62 is positively retained in the receiving well 40 of the first item holder 22 by engagement with the air bladders 36A-36D thereof. It is contemplated that the air bladders 36A-36D provide a customized retaining area 46 for the portable electronic device 62 and will also provide a customized retaining area 46 for another portable electronic device that is larger or smaller than the portable electronic device 62 illustrated in FIG. 4. In this way, the item holders 22, 24 of the present concept provide customized support and retention of items stored in the retaining areas 46 thereof, as further described below.

Figure 5A:
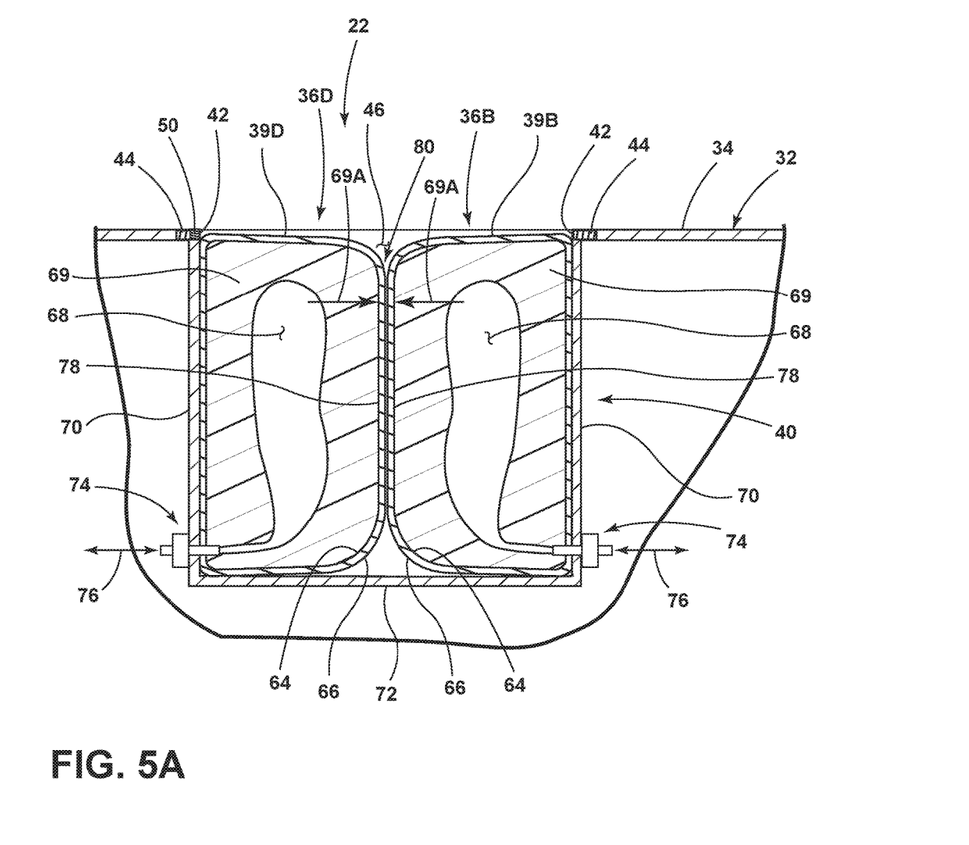
FIG. 5A is a cross-sectional view of one of the item holders of FIG. 2 taken at line VA.

Referring now to FIG. 5A, the first item holder 22 is shown in the at-rest position, wherein the air bladders 36B and 36D are in a fully inflated condition. Given the cross-sectional view of FIG. 5A, one of ordinary skill will appreciate that the other air bladders (36A and 36C shown in FIG. 2) of the first item holder 22 will have similar components and a similar configurations as the air bladders 36B and 36D shown in FIG. 5A and described below. In the inflated condition, the air bladders 36B and 36D of the first item holder 22 are inflated to a point at which the air bladders 36B and 36D (along with air bladders 36A and 36C shown in FIG. 2) generally fill the receiving well 40. In the at-rest position, the air bladders 36B and 36D of the first item holder 22 have the upper portions 39B and 39D thereof substantially flush with the upper opening 42 of the receiving well 40. In this way, the air bladders 36B and 36D (along with air bladders 36A and 36C shown in FIG. 2) substantially fill the upper opening 42 of the receiving well 40 in the at-rest position. Further, the upper portions 39B and 39D of the air bladders 36B and 36D are also substantially flush with the upper surface 34 of trim article 32.

With further reference to FIG. 5A, each of the air bladders 36B, 36D includes an outer casing 64 having an outer surface 66. Thus, the upper portions 39B, 39D of the air bladders 36B, 36D are defined by the outer surfaces 66 of the outer casing 64. As further shown in FIG. 5A, the outer casings 64 generally enclose interior cavities 68 of the air bladders 36B, 36D which are configured to fill with air to the at-rest position. As further shown in FIG. 5A, the air bladders 36B, 36D may also include a filler material 69 which may be a foam-like material, such as memory foam, or other like spacer material, such as a 3-D printed elastomeric matrix. The filler material 69 may be used to channel air within the air bladders 36B, 36D to a valve assembly 74 which may be in communication with ambient air, or may be in communication with the inflation system 56 shown in FIG. 2. The valve assembly 74 is contemplated to provide air into and out of the air bladders 36B, 36D, such that the air moves through the valve assembly 74 in the directions as indicated by arrows 76. Further, it is contemplated that the outer casings 64 may be porous outer casings that allows for exchange of air from the interior cavities 68 of the air bladders 36B, 36D to the outside atmosphere under certain pressure conditions. Thus, it is contemplated that with the air bladders 36B, 36D in the inflated condition shown in FIG. 5A, air can be expelled from the air bladders 36B, 36D when an item applies pressure to the outer casing 64 when the outer casing 64 is a porous outer casing, such that the air bladders 36B, 36D can partially deflate to customize the parameters of the retaining area 46 disposed between the air bladders 36B, 36D for retaining the item within the receiving well 40. In the embodiment shown in FIG. 5A, the receiving well 40 includes a sidewall 70 and a bottom wall 72, wherein the valve assemblies 74 are disposed on the sidewall 70 for communication with the air bladders 36B, 36D. In the embodiment shown in FIG. 5A, two valve assemblies 74 are shown, however, any number of valve assemblies can be used with the present concept to provide the inflation and deflation capabilities of the air bladders 36B, 36D.

As further shown in FIG. 5A, the outer casings 64 include abutment portions 78 which abut one another along an abutment seam 80 when the air bladders 36B, 36D are in the at-rest position, also known as the inflated condition. The abutment portions 78 of the outer casings 64 are configured to contact an item retained in the retaining area 46 to retain the item in the retaining area 46, as further described below with reference to FIG. 5B.

With further reference to FIG. 5A, the filler material 69 may fill the entirety of the interior cavity 68 of the air bladders 36B, 36D and may also be a resilient material that is operable between expanded and compressed conditions. It is further contemplated that the filler material 69 may be biased to the expanded condition, wherein the air bladders 36B, 36D would be fully inflated when the filler material 69 is in the expanded condition. The filler material 69 can move from the expanded condition (FIG. 5A) to a compressed condition (FIG. 5B) as an item is received in the receiving well 40. It is contemplated that the sensor 50 can detect an item entering the receiving well 40 to open the valve assemblies 74 via a direct link between the sensor 50 and the valve assemblies 74, or through the controller 54 (FIG. 2). With the valve assemblies 74 open, the air bladders 36B, 36D can expel air through the valve assemblies 74 as the item enters the receiving well 40 and as the filler material 69 moves from the expanded condition to the compressed condition. As the filler material 69 moves from the expanded condition to the compressed condition, air can be channeled out of the air bladders 36B, 36D through the valve assembly 74. The valve assembly 74 can be operable between open and closed positions that could be controlled by a controller, such as controller 54 shown in FIG. 2, when an item is detected by the sensor 50. When an item is removed from the receiving well 40, the sensor 50 can detect such a movement to send a signal to open the valve assembly 74 to allow air to enter the air bladders 36D, 36B to move the air bladders 36B, 36D from the retracted position to the at-rest position shown in FIG. 5A, as the filler material 69 moves from the compressed condition to the expanded condition. In such a system, the air bladders 36B, 36D do not need a separate inflation mechanism to inflate to the at-rest position from the retracted position given the internal and outwardly directed forces 69A acting on the outer casing 64 by the filler material 69 as the filler material 69 resiliently reassumes the expanded condition from the compressed condition. The operation of the filler material 69 to bring about changes in the overall condition of the air bladders 36B, 36D is further described below with reference to FIGS. 7A and 7B.

Figure 5B:
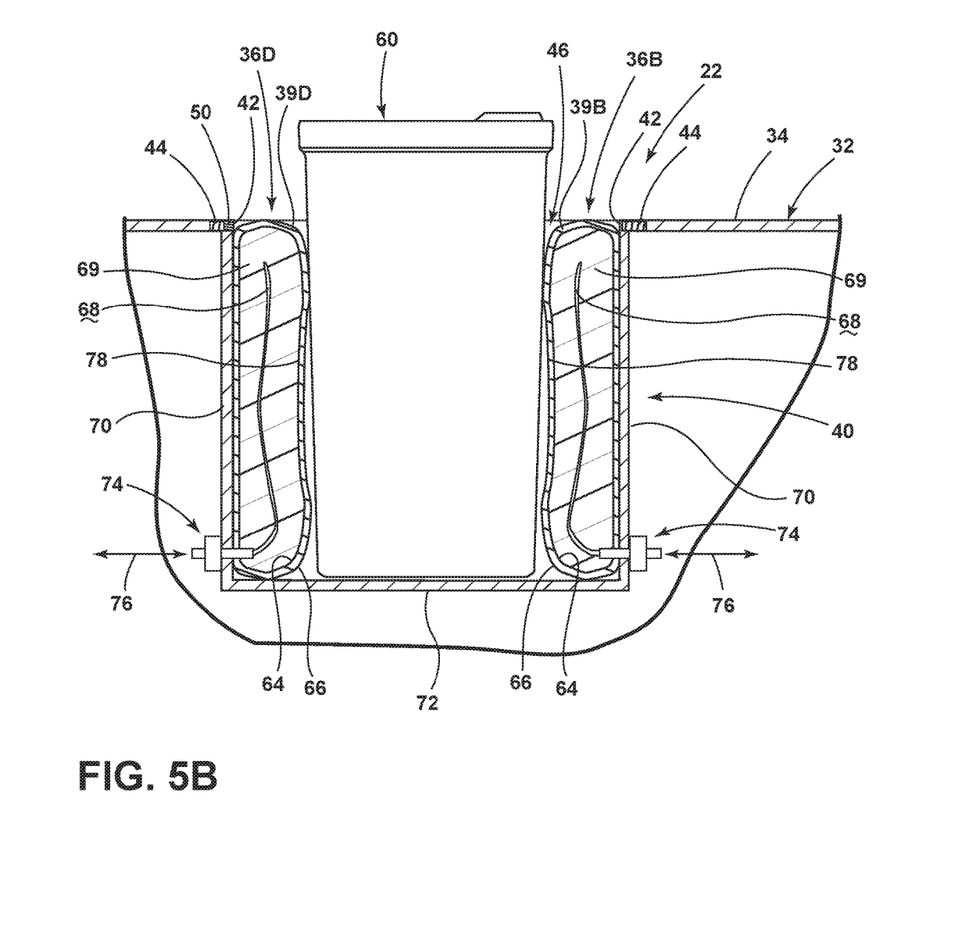
FIG. 5B is a cross-sectional of one of the item holders of FIG. 3 taken at line VB with a beverage container retained therein.

Referring now to FIG. 5B, the beverage container 60 is shown inserted into the receiving well 40 of the first item holder 22. With the beverage container 60 in the received position within the receiving well 40, within the retaining area 46 thereof, the air bladders 36B, 36D have moved from the at-rest position to the retracted position. In this retracted position, the air bladders 36B, 36D have partially inflated under a pressure by the beverage container 60 as the beverage container 60 enters the receiving well 40. Air expelled from the air bladders 36B, 36D is contemplated to be directed through the valve assemblies 74 which are contemplated to move to the open position when the sensor 50 detects the entry of the beverage container 60 into the receiving well 40. As further shown in FIG. 5B, the filler material 69 is in a compressed condition, wherein the filler material 69 is loaded and ready to move to the expanded position, as biased thereto, when the beverage container 60 is removed from the receiving well 40. When the beverage container 60 is removed from the receiving well 40, the sensor 50 will detect such a movement and open the valve assemblies 74 to allow air to enter the interior cavities 68 of the air bladders 36B, 36D, such that the air bladders 36B, 36D will move from the retracted position to the at-rest position under the outward pressure 69A exerted by the filler material 69 on the outer casing 64 as the filler material 69 moves to the expanded position. Thus, when the beverage container 60 is removed from the receiving well 40, the air bladders 36B, 36D will resume the at-rest position as shown in FIG. 5A without the need for a separate inflation system. In this way, air bladders 36B, 36D are said to be self-adjusting. When the filler material 69 is absent or not a resilient filler material, the air bladders 36B, 36D can be inflated using an inflation system controlled by a controller, such as the controller 54 and inflation system 56 shown in FIG. 2, to fill the air bladders 36B, 36D using the valve assemblies 74.

Figure 6:
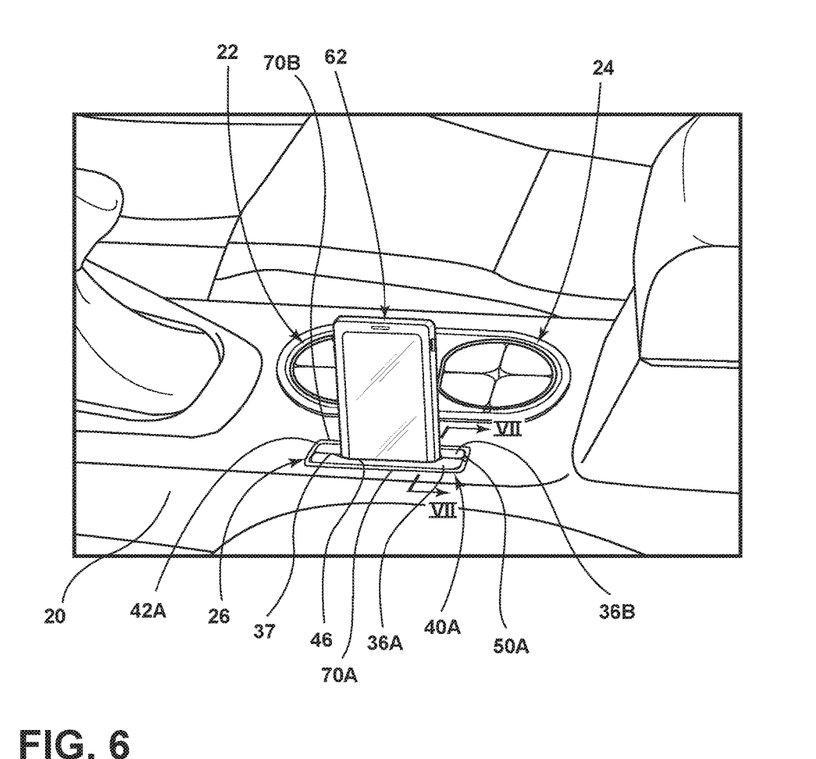
FIG. 6 is a top perspective view of a vehicle interior having a center console including multiple item holders.

Referring now to FIG. 6, a third item holder 26 is shown having first and second air bladders 36A, 36B disposed within a receiving well 40A, wherein the receiving well 40A includes an upper opening 42A with a sensor 50A disposed thereon. The first and second air bladders 36A, 36B are shown abutting one another along an abutment seam 37. In the embodiment shown in FIG. 6, an item, in the form of a portable electronic device 62, is shown received in the retaining area 46 disposed between the first and second air bladders 36A, 36B. Thus, in the embodiment shown in FIG. 6, the first and second air bladders 36A, 36B are contemplated to be in a retracted position, wherein an item 62 is retained therebetween. The third item holder 26 is configured such that the receiving well 40A is an elongate receiving well having opposed sidewalls 70A, 70B. The first and second air bladders 36A, 36B are disposed on the opposed sidewalls 70A, 70B, respectively.

Figure 7A:
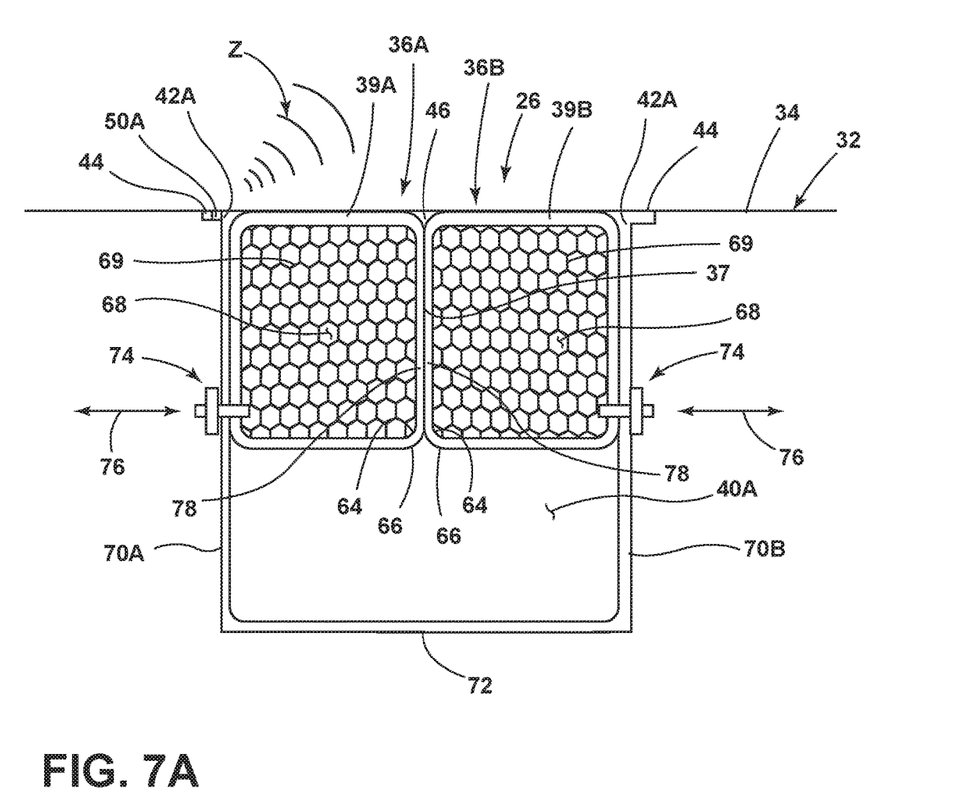
FIG. 7A is a cross-sectional view of an item holder in an at-rest position.
Figure 7B:
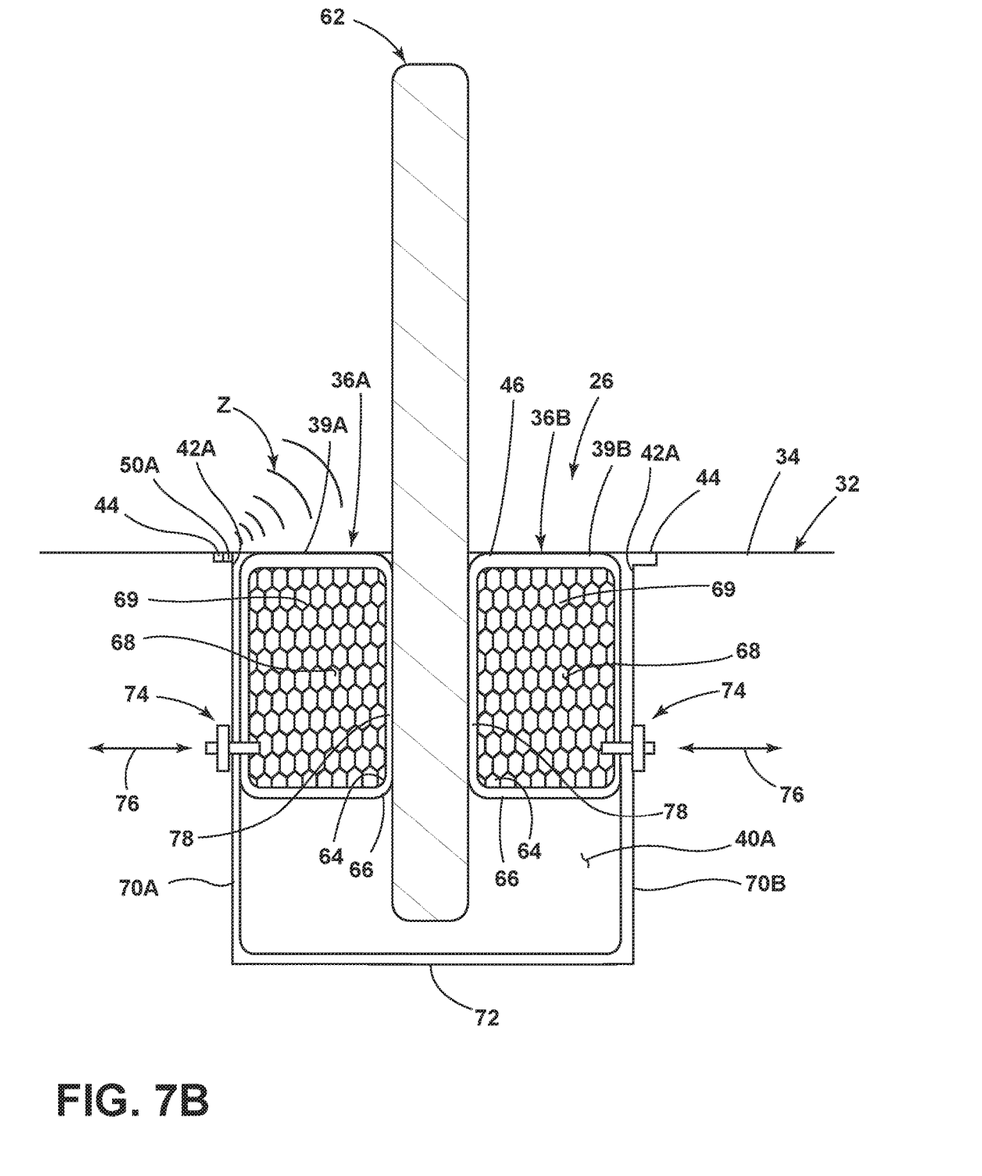
FIG. 7B is a cross-sectional view of the item holder of FIG. 7A with a portable electronic device retained therein.

Referring now to FIG. 7A, the cross sectional view of the third item holder 26 is shown having air bladders 36A, 36B disposed on opposed sidewalls 70A, 70B of the receiving well 40A. The opposed sidewalls 70A, 70B are further coupled together at bottom wall 72 of the receiving well 40A. The first and second air bladders 36A, 36B are shown in the inflated condition or at-rest position, wherein the first and second air bladders 36A, 36B abut one another along the abutment seam 37 disposed between the air bladders 36A, 36B. The air bladders 36A, 36B of the embodiment of FIG. 7A are shown in a fully inflated condition, yet the air bladders 36A, 36B do not fill the entire receiving well 40A of the third item holder 26. Thus, it is contemplated that the air bladders 36A, 36B may be configured to substantially fill the receiving well 40A or may partially fill the receiving well 40A when they are in the fully inflated condition. For an item holder configured such as item holder 26, the air bladders 36A, 36B need only partially fill the receiving well 40A in the inflated or at-rest position for holding an item as further described below with reference to FIG. 7B. In a manner similar to the description above with reference to FIG. 5A, the air bladders 36A, 36B include outer casings 64 having outer surfaces 66. The outer casings 64 are configured to seal an interior cavity 68 of the air bladders 36A, 36B. The air bladders 36A, 36B further include a filler material 69 shown in a honeycomb shaped pattern which may be an elastomeric material or other polymeric material that is operable between expanded and compressed conditions. In FIG. 7A, the material is shown in an expanded condition to which the filler material 69 is contemplated to be biased. As shown in FIG. 7A, the air bladders 36A, 36B are in communication with valve assemblies 74 disposed on the opposed sidewalls 70A, 70B of the receiving well 40A. The filler material 69 is contemplated to move to a compressed condition from the expanded condition shown in FIG. 7A when an item is received in the item holder 26. An item entering the item holder 26 is contemplated to be detected by the sensor 50A disposed on the upper opening 42A of the receiving well 40A. As specifically shown in FIG. 7A, the sensor 50A includes a zone of detection Z which is contemplated to detect an item being received in the receiving well 40A of the item holder 26. By detecting such an item entering the item holder 26, the sensor 50A can cause a signal to be directly sent to the valve assembly 74, or to a controller, to open the valve assembly 74 to allow air to escape therethrough as the item imparts a force on the air bladders 36A, 36B. As an item imparts a force on the air bladders 36A, 36B, the filler material 69 will move from the expanded condition (FIG. 7A) to the compressed condition (FIG. 7B). As the filler material 69 moves to the compressed condition from the expanded condition, air is expelled from the interior cavities 68 of the air bladders 36A, 36B through the valve assemblies 74 in the direction as indicated by arrow 76.

Referring now to FIG. 7B, an item 62, in the form of a portable electronic device, is shown received in the item holder 26 and retained between the air bladders 36A, 36B, along abutment portions 78 thereof. The pressure of the item 62 entering the receiving wall 40A has caused the filler material 69 to move from the expanded condition (FIG. 7A) to the compressed condition (FIG. 7B). With the item 62 properly retained in the item holder 26, it is contemplated that the valve assembly 74 will move to a closed position to keep the inflation level of the air bladders 36A, 36B in a static condition for properly maintaining the retained position of the item 62. When the item 62 is removed from the item holder 26, the sensor 50A will detect this movement and send a signal to open the valve assembly 74. With the valve assembly 74 open, the filler material 69 can move from the compressed condition (FIG. 7B) to the expanded condition (FIG. 7A) as the filler material is contemplated to be flexibly resilient and biased to the expanded condition. With the outer casings 64 providing for a sealed interior cavity 68 of the air bladders 36A, 36B, the expansion of the filler material 69 to the expanded condition from the compressed condition will draw air into the interior cavities 68 of the air bladders 36A, 36B through the open valve assembly 74. In this way, the air bladders 36A, 36B are said to be self-adjusting. Further, it is contemplated that the outer casings 64 are flexible outer casings that may also be flexibly resilient. The outer casings 64 may include a rubberized material that can deflect under the pressure of an item entering a receiving well, and resiliently spring back into the at-rest shape when the item is removed. Such an outer casing may resemble a rubberized material such as that used on a racket ball.

Thus, the item holders 22, 24 and 26 of the present concept are contemplated to provide aesthetically pleasing configurations with air bladders in an at-rest position being substantially flush with an upper opening of a receiving well of the respective item holders 22, 24, 26. The item holders are contemplated to receive any number of items that can fit within the receiving well and properly retain the same using the air bladders of the present concept. When the item is removed, the air bladders are configured to self-inflate to resume a position in which the receiving wells appear substantially full and flush with the upper opening thereof.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An item holder, comprising:
   a receiving well having an upper opening;
   a plurality of air bladders disposed in the receiving well and operable to deflate from an at-rest position to a retracted position as an item is received in the receiving well, wherein each air bladder includes an outer casing, a portion of which is configured to abut the outer casing of at least two other air bladders of the plurality of air bladders and wherein the portion of the outer casing abutting the at least two other air bladders is largest when the plurality of air bladders are in the at-rest position; and a controller coupled to a sensor and an inflation system, wherein the controller initiates an inflation sequence of the inflation system to inflate the air bladders as the item is removed from the receiving well in response to the sensor sensing that the item is removed.

2. The item holder of claim 1, wherein air is expelled from the air bladders through a deflation sequence of the inflation system as initiated by the controller when the item is sensed as being received in the receiving well.

3. The item holder of claim 1, wherein the air bladders deflate to the retracted position from the at-rest position when pressure is applied to the air bladders as the item is received in the receiving well.

4. The item holder of claim 3, including:
a filler material disposed within interior cavities of the air bladders, the filler material being operable between expanded and compressed conditions, wherein the air bladders are in the at-rest position when the filler material is in the expanded condition, and further wherein the air bladders are in the retracted position when the filler material is in the compressed condition.

5. An item holder, comprising:
a plurality of air bladders disposed in a receiving well and configured to abut and secure an item in the receiving well, wherein the air bladders inflate when the item is removed from the receiving well; and a controller coupled to a sensor and an inflation system, wherein the controller initiates an inflation sequence of the inflation system to inflate the air bladders as the item is removed from the receiving well in response to the sensor sensing that the item is removed.

6. The item holder of claim 5, wherein each air bladder includes an outer casing sealing an interior cavity and the outer casing is flexibly resilient.

7. The item holder of claim 6, further comprising:
a filler material disposed within each interior cavity and operable between expanded and compressed conditions, wherein the filler material is biased towards the expanded condition.

8. The item holder of claim 7, including:
one or more valve assemblies in communication with the interior cavities of each of the plurality of air bladders.

9. The item holder of claim 8, wherein the one or more valve assemblies are operable between open and closed positions.

10. The item holder of claim 9, wherein the sensor is coupled to the receiving well for sensing an item being received in the receiving well and removed from the receiving well, wherein the one or more valve assemblies move to the open position as the sensor detects an item being received in the receiving well or as the sensor detects an item being removed from in the receiving well.

* * * * *